United States Patent [19]

Bergsten

[11] 4,275,857
[45] Jun. 30, 1981

[54] COOLING SYSTEM FOR RAMJET ENGINE

[75] Inventor: M. Brian Bergsten, Centerville, Ohio

[73] Assignee: The United States of America as represented by the Secretary of the Air Force, Washington, D.C.

[21] Appl. No.: 91,220

[22] Filed: Nov. 5, 1979

[51] Int. Cl.³ .......................................... B64D 33/02
[52] U.S. Cl. ...................... 244/53 B; 60/39.18 C; 60/266; 60/728; 62/5; 62/239; 62/241; 137/15.1; 244/117 A
[58] Field of Search ............... 60/266, 728, 39.18 C; 244/53 B, 117 A; 137/15.1; 62/5, 239, 241

[56] References Cited

U.S. PATENT DOCUMENTS

| | | | |
|---|---|---|---|
| 1,952,281 | 3/1934 | Ranque | 62/5 |
| 2,644,315 | 7/1953 | Jamieson | 62/5 |
| 2,669,101 | 2/1954 | Shields | 62/5 |
| 2,786,341 | 3/1957 | Green | 62/5 |
| 2,839,900 | 6/1958 | Green | 62/5 |
| 2,839,901 | 6/1958 | Green | 62/5 |
| 2,858,698 | 11/1958 | Hickey | 62/5 |
| 2,873,582 | 2/1959 | Green | 62/5 |
| 2,893,204 | 7/1959 | Anderson et al. | 60/39.18 C |
| 3,090,208 | 5/1963 | Munakata | 62/5 |
| 3,361,336 | 1/1968 | Foa | 62/5 |
| 3,461,676 | 8/1969 | Toelke et al. | 62/5 |
| 3,703,146 | 11/1972 | Kovats | 60/39.18 C |
| 3,973,396 | 8/1976 | Kronogard | 60/39.09 D |

Primary Examiner—Ronald C. Capossela
Attorney, Agent, or Firm—Donald J. Singer; Richard J. Killoren

[57] ABSTRACT

A ramjet powered vehicle having a bleed slot in the subsonic diffuser, for the ramjet combustor, which supplies air to a turbine for supplying power to vehicle accessories. A vortex tube is provided between the bleed slot and the turbine to provide a cool air supply. Radar absorbing material is positioned adjacent ramjet inlet with a cooling duct provided to supply cooling air from the vortex tube to the ramjet inlet cowl lip to provide cooling for the radar absorbing material.

2 Claims, 4 Drawing Figures

FIG. 1 PRIOR ART
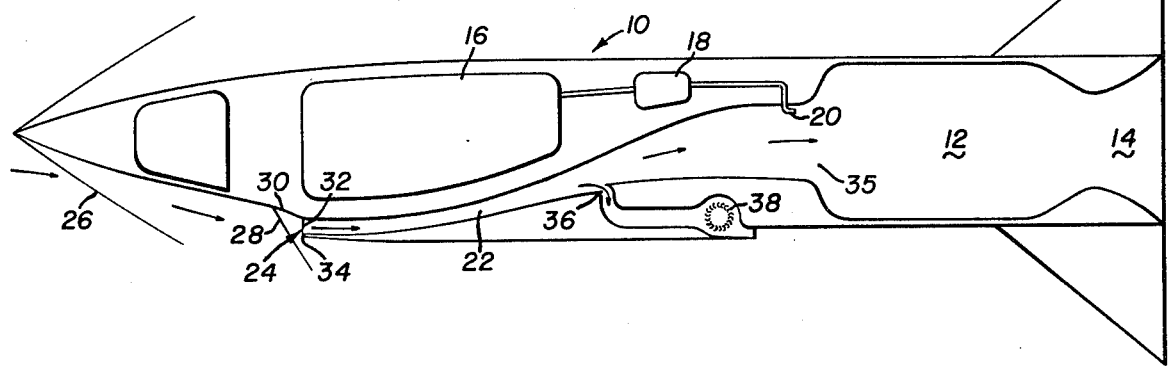
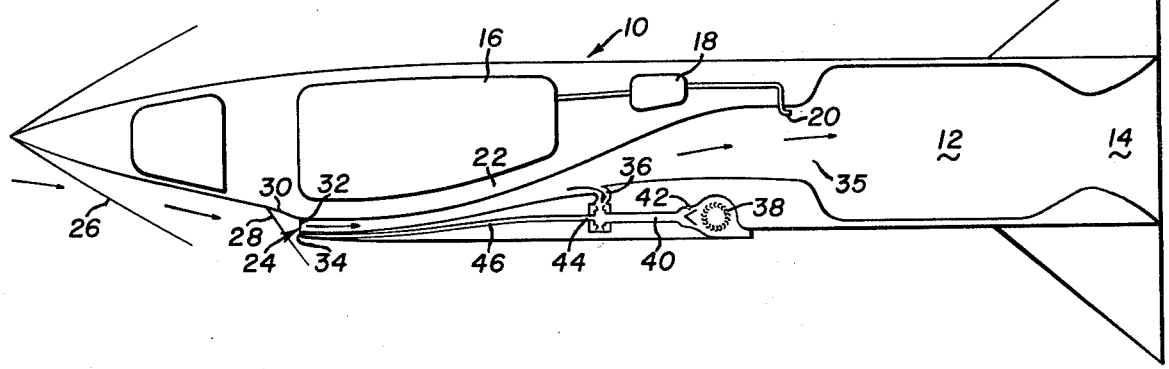
FIG. 2
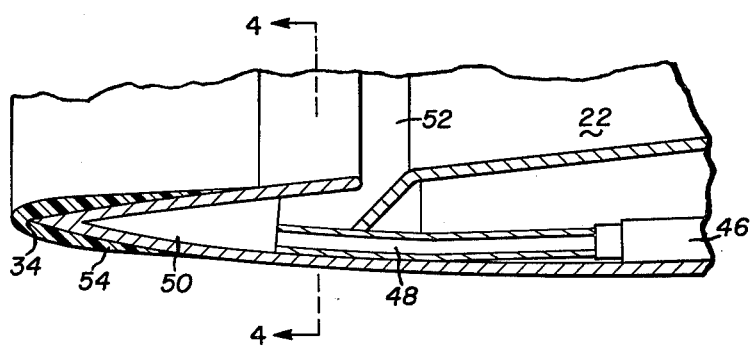
FIG. 3
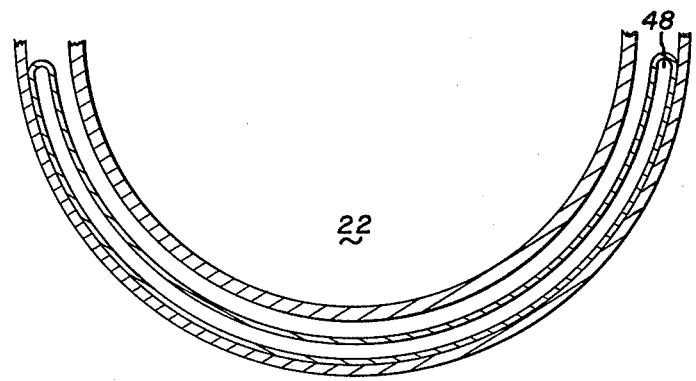
FIG. 4

COOLING SYSTEM FOR RAMJET ENGINE

RIGHTS OF THE GOVERNMENT

The invention described herein may be manufactured and used by or for the Government of the United States for all governmental purposes without the payment of any royalty.

BACKGROUND OF THE INVENTION

This invention relates to a cooling system for use on a ramjet powered vehicle. The patents to Rangue, U.S. Pat. No. 1,952,281; Shields, U.S. Pat. No. 2,669,101; and Toelke et al, U.S. Pat. No. 3,461,676 disclose systems using a vortex tube to provide fluids at different temperatures.

Current designs for ramjet powered vehicles traveling at supersonic speeds do not have means for cooling critical equipment such as radar absorbing material. Since radar absorbing materials have inadequate structural properties at high temperatures, other means are necessary to reduce the susceptibility of such vehicles to radar detection. It may be necessary, for example, to alter the aerodynamic configuration of the ramjet inlet to make it less susceptible to radar detection. This however will reduce vehicle performance.

BRIEF SUMMARY OF THE INVENTION

According to this invention a ramjet powered vehicle using a bleed slot, in the subsonic diffuser, to power an accessory turbine is modified to provide cooling air which is ducted to the region of the ramjet inlet cowl lip. Radar absorbing material is positioned adjacent the ramjet inlet with the cooling air from the vortex tube being used to provide cooling for the radar absorbing material.

IN THE DRAWING

FIG. 1 is a schematic diagram of a prior art ramjet powered vehicle with a turbine driven by bleed air from the subsonic diffuser.

FIG. 2 is a schematic diagram of the device of FIG. 1 modified according to the invention.

FIG. 3 is an enlarged partially schematic view of the ramjet inlet for the device of FIG. 2.

FIG. 4 is a partially schematic sectional view of the device of FIG. 3 along the line 4—4.

DETAILED DESCRIPTION OF THE INVENTION

Reference is now made to FIG. 1 of the drawing which shows a ramjet powered vehicle 10 including a conventional ramjet dump combustor 12 with an exit nozzle 14. Fuel is supplied to the combustor from fuel supply 16 through fuel control 18 and fuel injector 20. A subsonic diffuser 22 is provided between the inlet 24 and the combustor 12. Shown in this figure are the bow shock wave 26, the oblique shock wave 28, caused by the inlet ramp 30, and the normal shock wave 32 that for this case sets at the cowl lip 34, which are the typical shock waves for supersonic flight. Air flow upstream of the normal shock 32 is supersonic and the air flow downstream of the normal shock 32 is subsonic. The subsonic diffuser is wrapped around the bottom of the circular missile body and has a modified crescent shaped inlet 24. The diffuser changes from the modified crescent shape to a circular shape at the combustor inlet 35. At the bottom of the subsonic diffuser 22 is a bleed slot 36 which diverts a portion of the high pressure air from the subsonic diffuser to a ram air turbine 38. The ram air turbine 38 provides power for the engine and vehicle accessories. The structure thus far described is known in the prior art.

According to this invention the structure of FIG. 1 is modified as shown in FIG. 2. A conventional vortex tube 40 is connected between the bleed slot 36 and the ram turbine 38. The hot air outlet 42 of the vortex tube is connected to the inlet of turbine 38. The cold air outlet 44 of the vortex tube is connected to a duct 46 which supplies cooling air to the cowl lip 34 as shown in greater detail in FIGS. 3 and 4.

The duct 46 is connected to a flow channel 48 which directs the cooling air into the lip channel 50 around the ramjet inlet. The air then enters the flow in diffuser 22 in a high velocity low pressure region just downstream of the normal shock 32 through slot 52. This provides cooling for radar absorbing material indicated at 54.

In the operation of the device the high pressure air from the subsonic diffuser normally supplied to turbine 38 is supplied to the turbine through a conventional vortex tube 40. Air from the vortex tube cold air outlet 44 is connected to flow channel 48 through duct 46 to supply cooling air to lip channel 50. This provides cooling for the radar absorbing material 54. The air from channel 48 is fed to a high velocity low pressure region of the diffuser 22 through slot 52.

While the device has been described as providing cooling for the radar absorbing material adjacent the ramjet inlet cowl lip, it could be used for providing cooling for any cooling load requirements of the ramjet powered vehicle.

There is thus provided a system for supplying cooling air for the cooling loads on ramjet powered vehicles.

I claim:

1. A supersonic ramjet powered vehicle comprising: a missile body member; a ramjet combustor having an exit nozzle positioned at the aft end of said missile body member; a cowl lip member secured to the missile body and forming a ramjet inlet; a subsonic diffuser between said ramjet inlet and said combustor; an accessory turbine positioned adjacent said subsonic diffuser; means for supplying bleed air from said diffuser to said turbine; a vortex tube connected between the subsonic diffuser and said accessory turbine; said vortex tube including a pressure inlet connected to said subsonic diffuser, a hot gas outlet connected to said turbine and a cold air outlet; said ramjet vehicle including a cooling load; means for connecting said cooling load to the cold air outlet of said vortex tube.

2. The device as recited in claim 1 wherein said cooling load includes said cowl lip member; a layer of radar absorbing material covering the cowl lip member; said means for connecting the cooling load to the cold air outlet of the vortex tube including a cold air duct and a flow channel for directing the cold air from the vortex tube to said cowl lip member; means for directing the air from said flow channel to a low pressure region of the subsonic diffuser just down stream of the ramjet inlet.

* * * * *